Oct. 10, 1961    J. C. GENDREAU    3,003,477
SLIDE-VALVE DEVICE FOR DISTRIBUTING FLUID UNDER PRESSURE
Filed May 12, 1960    3 Sheets-Sheet 1
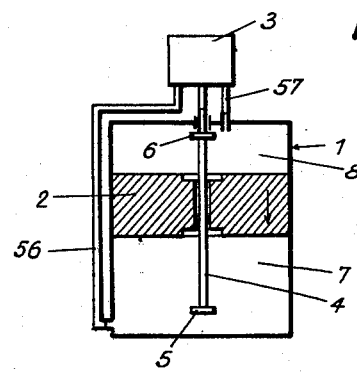
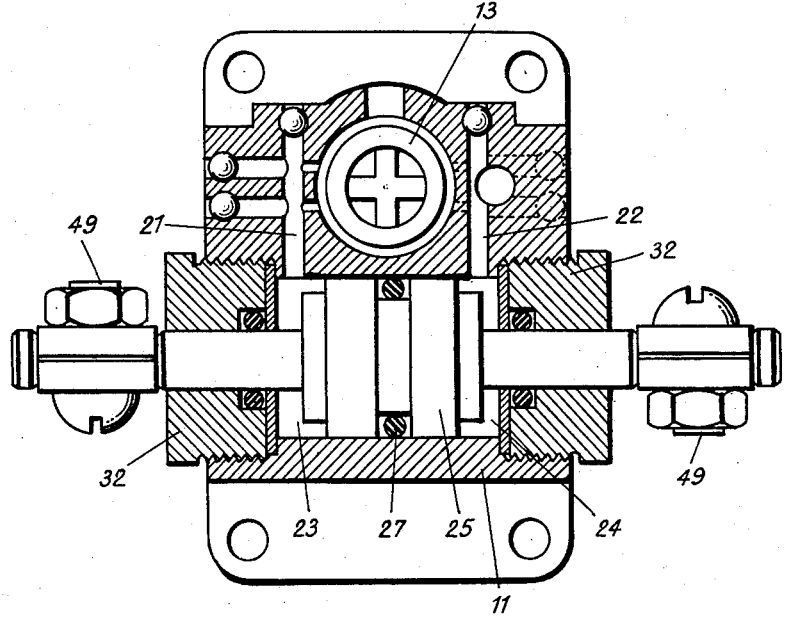
Inventor
Jacques Camille Gendreau
By Stevens Davis Miller & Mosher
Attorneys Oct. 10, 1961  J. C. GENDREAU  3,003,477
SLIDE-VALVE DEVICE FOR DISTRIBUTING FLUID UNDER PRESSURE
Filed May 12, 1960  3 Sheets-Sheet 2

Inventor
Jacques Camille Gendreau
By Stevens Davis Miller & Mosher
Attorneys

Oct. 10, 1961 J. C. GENDREAU 3,003,477
SLIDE-VALVE DEVICE FOR DISTRIBUTING FLUID UNDER PRESSURE
Filed May 12, 1960 3 Sheets-Sheet 3
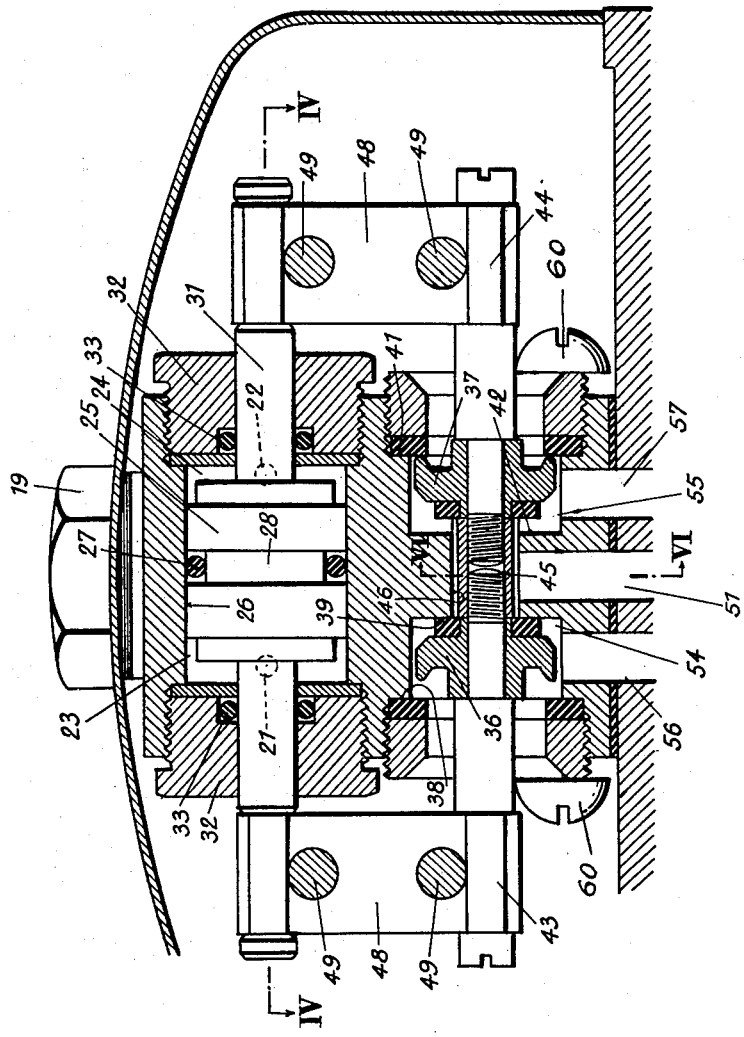
Inventor
Jacques Camille Gendreau
By Stevens Davis Miller & Mosher
Attorneys

United States Patent Office 3,003,477
Patented Oct. 10, 1961

3,003,477
SLIDE-VALVE DEVICE FOR DISTRIBUTING FLUID UNDER PRESSURE
Jacques Camille Gendreau, 18 Rue Berthier, Versailles, France
Filed May 12, 1960, Ser. No. 28,692
Claims priority, application France Mar. 27, 1959
3 Claims. (Cl. 121—157)

The invention relates to slide-valve devices for distributing fluid under pressure for the control of reciprocating engine, more particularly devices in which the slide-valve of the distributor is actuated directly by the rod of the engine piston at the end of the travel of said rod.

The object of the invention is to provide a distributing device which, whilst being of simple construction and having a lower cost than that of the conventional devices, does not have the tendency of the latter to "stick" particularly at low speeds of movement, owing to the glazing of the surfaces necessitated by fluid-tightness requirements.

To this end, the distributor according to the invention comprises a primary distributing slide-valve having small-surface bearings and the outlet channels of which are connected respectively to two small-capacity chambers of a cylinder containing the operating piston of a secondary device for distributing fluid to the engine, preferably taking the form of a system of valves with a view to reducing friction.

Such a device thus comprises a relay interposed between the primary slide-valve and the valve system for distributing fluid to the engine. This arrangement makes it possible to reduce considerably the bearings of the primary slide-valve and hence the friction of said slide-valve in its cylinder. The ports which co-operate with the bearings of this valve are naturally also short but this does not constitute a disadvantage, because the chambers of the cylinder of the control relay for the secondary distributing device are of small capacity and the relay piston is therefore moved practically instantaneously in spite of the small output of the primary slide-valve device. Problems of fluid-tightness may be still further simplified, in the primary slide-valve, owing to the fact that it is possible to utilise in the latter an operating pressure which is lower than the pressure of the fluid supplying the engine.

According to another feature of the invention, the bearings of the slide-valve are constituted by joints of plastic material, for example toric joints, housed in annular grooves in the said slide-valve and co-operating with the cylindrical surface of the cylinder in which the slide-valve is housed. The plastic material used may for example be that known in industry under the name of "Teflon" or "Vulkolan."

In one embodiment the above-mentioned valve system comprises two chambers, each chamber being in communication, through its middle part, with one chamber of the engine cylinder, whilst its two ends carry the seats of two coaxial valves communicating with the source of fluid under pressure (for example compressed air) and with the outflow (for example the atmosphere), respectively.

In a particular embodiment the four valves of the system are carried by the same rod.

The invention will be better understood from the ensuing description with reference to the accompanying drawings which, by way of example only, shows one embodiment of the invention.

FIG. 1 shows diagrammatically the position of a slide-valve device for distributing fluid under pressure according to the invention for driving a reciprocating engine.

FIG. 3 is a section along the line III—III of FIG. 2.

FIG. 4 is a horizontal section along the line IV—IV of FIG. 3.

FIG. 6 is a partial section along the line VI—VI of FIG. 3.

Figure 2:
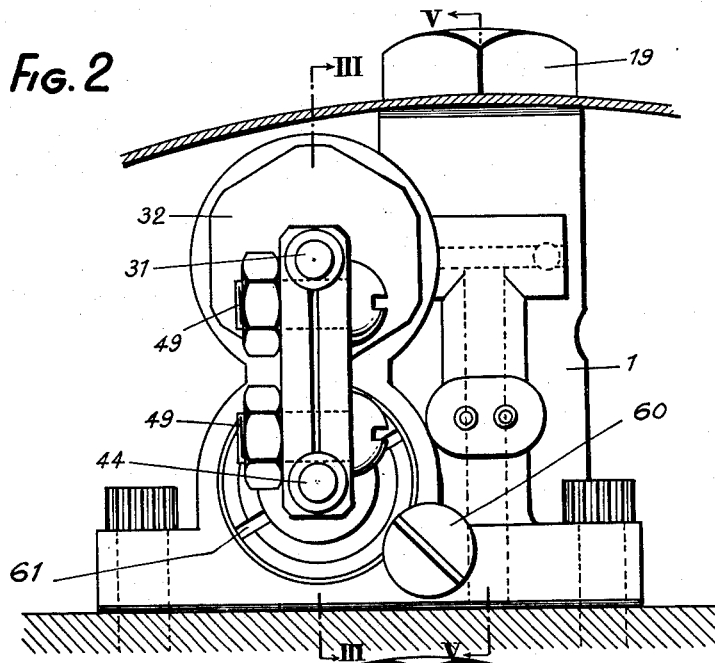
FIG. 2 is a view in elevation, on an enlarged scale, of the distributing device.
Figure 5:
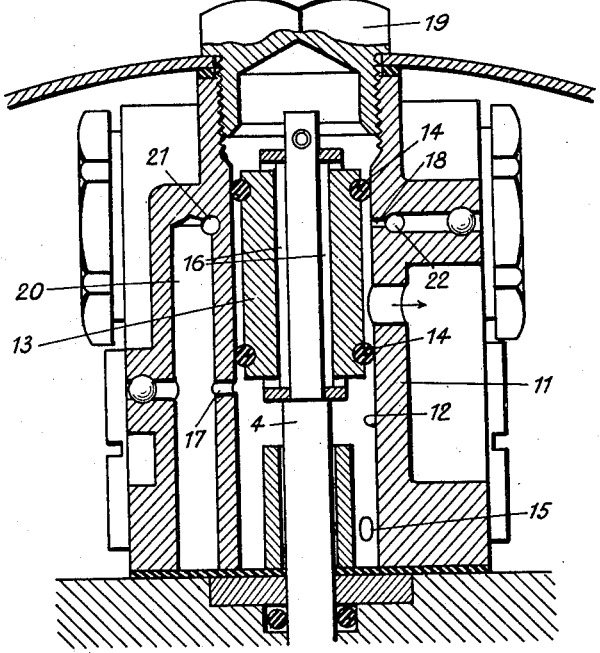
FIG. 5 is a section along the line V—V of FIG. 2.

In FIGURE 1 there is shown very diagrammatically only part of a reciprocating compressed air engine comprising a cylinder 1 inside which can move a piston 2 under the action of compressed air admitted selectively and successively into the two chambers 7 and 8 of the cylinder, formed by the piston 2, by a distributor device 3 actuated by a rod 4 provided with two abutments 5 and 6 against which the piston 2 comes to bear at the end of each of its strokes. This is the distributor device 3 which shown in detail in FIGURES 2 to 6.

The distributor device comprises a body 11 which has a cylindrical bore 12 closed by a plug 19 and in which can slide a primary distributing slide-valve 13 integral with the control rod 4. The slide-valve 13 is cylindrical and its bearing surfaces, in the cylinder 12, are constituted by joints 14 which, in this example, are toric joints of plastic material, such as that known under the names of "Teflon" or "Vulkolan," housed in annular grooves formed at the ends of the said slide-valve. The fluid under pressure, in this example compressed air, is admitted to one of the ends of the cylinder 12 through an orifice indicated at 15 in FIGURE 3. The slide 13 is joined to the rod 4 and has inner channels 16 through which the compressed air can pass from end of the cylinder 12 to the other.

The slide-valve 13 co-operates with two ports 17 and 18 formed in the wall of the cylinder 12 and communicating through channels 21 and 22 (see also FIGURES 3 and 4) with the two chambers 23 and 24, respectively, of a relay comprising a piston 25 movable in a bore 26 formed in the body 11. The fluid-tightness of the piston 25 in the cylinder 26 is ensured by a toric joint 27 housed in an annular groove 28 in the said piston. The two chambers 23 and 24 have a small capacity and their length is just sufficient to allow the device to function as will be explained.

The piston 25 is provided with a rod 31 which passes through two cylinder heads 32 screwed into the ends of the bore 26. Fluid-tightness between these heads and the rods is likewise ensured by toric joints 33.

The piston rod 31 is connected to a movable group of two valves 36, 37 each co-operating with two seats 38, 39 and 41, 42, respectively, so as to form the above-mentioned secondary distributing device. These valves are mounted on two rods 43, 44 made integral with one another by being screwed into a sleeve 45 which slides in a bore 46 in the body 11. The outer ends of the two rods 43, 44 are connected respectively to the ends of the rod of the piston 31 by two pairs of plates 48 tightened by bolts 49.

The seats 38 and 41 communicate directly with the atmosphere, whilst the seats 39 and 42 communicate with an admission channel 51 for compressed air through gaps formed by flattened portions 52 on the sliding sleeve 45.

Each of the two valves 36 and 37 is located in a chamber 54, 55, respectively, communicating through channels 56 and 57 with the two chambers 7 and 8 (FIGURE 1) of the compressed air engine.

The slide-valve distributing device operates as follows:
It is supposed, as shown in FIGURE 1, that the piston 2 of the compressed air engine is in the process of descending and that, in consequence, the rod 4 controlling the distributor is in its uppermost position, as shown in the other figures of the drawing.

The compressed air, admitted through the orifice 15 into the cylinder 12 of the primary distributing slide-valve, passes through the port 17 and the channel 20 into the channel 21 and from there into the chamber 23 of the cylinder 26 of the relay. It keeps the piston 25 at the end of its stroke towards the right, in FIGURE 3, so that the valve 36 is applied against its seat 39 and the valve 37 against its seat 41. In these circumstances the compressed air, admitted to the secondary distributor through the channel 51, passes into the chamber 55 and through the channel 57 into the upper chamber 8 of the cylinder 1 of the engine (FIGURE 1), whilst the air contained in the lower chamber 7 of the engine cylinder is discharged to the atmosphere through the channel 36, the chamber 54 and the valve seat 38.

When the piston 2 reaches the lower end of its stroke, it takes with it the rod 4 controlling the distributor slide-valve, so that the two toric joints 14 of the slide-valve are now located on either side of the port 17 and the compressed air, admitted through the orifice 15, now passes through the channels 16 into the upper part of the cylinder 12 and from there through the port 18 into the passage 22 and hence into the chamber 24 of the relay. The piston 25 of the relay is therefore suddenly urged towards the left (FIGURE 3) taking with it the group of valves, so that the valve 36 now bears against its seat 38, whilst the valve 37 bears against its seat 42. Under these conditions the compressed air, admitted through the passage 51 now passes into the chamber 54 and from there through the passage 56 into the lower chamber 7 of the cylinder 1 of the compressed air engine (FIGURE 1), whilst the upper chamber 8 is put in communication with the atmosphere through the passage 57 and the seat 41 of the valve 37. The piston 2 of the engine then begins to rise.

When the piston 2 reaches the upper end of its stroke, it will cause the slide-valve controlling rod 4 to rise again and the reverse operations will take place, that is to say the compressed air, admitted at 15, will again pass through the port 17, then through the passages 20 and 21 as far as the chamber 23, and the piston 25, urged to the right, will return the valves to their initial position, which will again set off the downward stroke of the engine piston.

It should be noted that the toric joints 14 of plastic material of the slide-valve 13 pass without any appreciable wear over the ports 17 and 18 feeding the slide-valve owing to the very small diameter of these ports.

Moreover, regulation of the valves 36 and 37 may take place during operation of the slide-valve. The seats 38 and 41 are carried by parts screwed onto the body 11 and each comprising externally a slot 61 (FIGURE 2), which makes it possible to modify from the outside and during operation the position of the seat relatively to that of the corresponding valve, so as to make the closing of valves 36 and 37 on the seats 39 and 41 and 38 and 42, respectively, coincide, this regulation being made necessary possibly by the varying crushing of the plastic joints which constitute the said seats and which have different diameters and degrees of hardness. Once the regulation has taken place, the parts carrying the seats 38 and 41 are locked by screws 60 (FIGURES 2 and 3).

While a particular embodiment of this invention has been illustrated and described herein, it is intended that this invention be not limited to such disclosure, and changes and modifications can be made and incorporated within the scope of the claims.

I claim:
1. A slide-valve device for distributing fluid under pressure for the control of a reciprocating engine, comprising a primary distributing slide-valve having small-surface bearings and the outlet channels of which are connected respectively to two small-capacity chambers of a cylinder containing the operating piston of a secondary valve system for distributing fluid to the engine, said valve system comprising two chambers, each chamber being in communication, through its middle part, with one chamber of the engine cylinder, whilst its two ends carry the seats of two coaxial valves communicating with the source of fluid under pressure and with the outflow, respectively.

2. A slide-valve device for distributing fluid under pressure for the control of a reciprocating engine, comprising a primary distributing slide-valve having small-surface bearings and the outlet channels of which are connected respectively to two small-capacity chambers of a cylinder containing the operating piston of a secondary valve system for distributing fluid to the engine, said secondary valve system comprising two chambers, each chamber being in communication, through its middle part, with one chamber of the engine cylinder, each chamber having two ends, valve seats in said ends, two coaxial valves in the seats communicating with the source of fluid under pressure and with the outflow, respectively, the four coaxial valves of the secondary valve system being carried by the same rod.

3. A slide-valve device for distributing fluid under pressure for the control of a reciprocating engine, comprising a primary distributing slide-valve having small-surface bearings and the outlet channels of which are connected respectively to two small-capacity chambers of a cylinder containing the operating piston of a secondary valve system for distributing fluid to the engine, said valve system comprising two chambers, each chamber being in communication, through its middle part, with one chamber of the engine cylinder, whilst its two ends carry the seats of two coaxial valves communicating with the source of fluid under pressure and with the outflow, respectively, the seats of the discharge valves being carried by parts screwed onto the body of the device and whose position can be modified, from the outside and during operation, means being provided for locking these parts after regulation.

References Cited in the file of this patent
UNITED STATES PATENTS

| | | |
|---|---|---|
| 674,835 | Bullard | May 21, 1901 |
| 818,284 | Pelham | Apr. 17, 1906 |
| 1,120,015 | Bourne | Dec. 8, 1914 |
| 1,199,526 | Bowser | Sept. 26, 1916 |
| 2,168,711 | Kyle | Aug. 8, 1939 |
| 2,912,007 | Johnson | Nov. 10, 1959 |